(12) United States Patent
Teng et al.

(10) Patent No.: US 6,411,749 B2
(45) Date of Patent: Jun. 25, 2002

(54) IN-LINE FIBER OPTIC POLARIZATION COMBINER/DIVIDER

(75) Inventors: Chia-Chi Teng, Piscataway; Jan W. Kokkelink, Blairstown; Talal K. Findakly, Hackettstown, all of NJ (US)

(73) Assignee: Micro-Optice, Inc., Hackettstown, NJ (US)

( * ) Notice: Subject to any disclaimer, the term of this patent is extended or adjusted under 35 U.S.C. 154(b) by 0 days.

(21) Appl. No.: 09/854,398

(22) Filed: May 11, 2001

Related U.S. Application Data

(60) Provisional application No. 60/203,408, filed on May 11, 2000.

(51) Int. Cl.[7] .................................................. G02B 6/27
(52) U.S. Cl. .......................... 385/11; 385/24; 359/495
(58) Field of Search ............................... 385/11, 16, 18, 385/24, 31, 33–36, 47; 359/115, 122, 127–129, 131, 495

(56) References Cited

U.S. PATENT DOCUMENTS

| | | | | |
|---|---|---|---|---|
| 5,923,470 A | * | 7/1999 | Pan et al. ................... | 359/495 |
| 6,014,256 A | * | 1/2000 | Cheng ......................... | 359/494 |
| 6,181,850 B1 | * | 1/2001 | Nakamura et al. ........... | 359/124 |
| 6,282,025 B1 | * | 8/2001 | Huang et al. ................ | 359/495 |
| 6,295,393 B1 | * | 9/2001 | Naganuma .................... | 385/11 |

* cited by examiner

Primary Examiner—Akm E. Ullah
Assistant Examiner—Michelle R. Connelly-Cushwa
(74) Attorney, Agent, or Firm—Micahel W. Ferrell

(57) ABSTRACT

An inline fiber optic polarization combiner/divider is proposed for use in fiber optic communications. It utilizes a polarizing beam splitting cube (PBSC) or a birefringent displacer located between a pair of collimating lenses. A reflecting film (either external or directly applied to one of the faces of the PBSC or birefringent displacer) is used to completely reflect one of the two polarizations and is positioned such that the optical path length between the lens and the reflecting film is equal to one focal length in order to accomplish an optical path where the input and output optical fibers are in-line with the package.

20 Claims, 3 Drawing Sheets

IN-LINE FIBER OPTIC POLARIZATION COMBINER/DIVIDER

CROSS-REFERENCE TO RELATED APPLICATIONS

This application claims the benefit of the filing date of U.S. provisional patent application Serial No. 60/203,408, filed May 11, 2000.

BACKGROUND AND SUMMARY OF THE INVENTION

The present invention is directed to optical components for use in fiber optic networks and particularly to devices known as optical polarization splitters (dividers) or combiners (multiplexers).

In fiber optical transmission systems the light beams traveling in two fibers must often be combined into a single fiber, a device which accomplishes this is called a combiner or multiplexer. Similarly, in such systems one beam must frequently be split into two or more beams, a device which accomplishes this is called a splitter or divider. A splitter or combiner is simply the same device used "in reverse" i.e. when a beam is launched from a single fiber through a splitter/combiner the beam will be split into two beams and directed to two output fibers, if two beams are launched from the previous "output" (now input) fibers back through the splitter/combiner the beams will be combined into a single beams and directed to the single "input" (now output) fiber as such splitter/combiners may be referred to as an optical "coupler".

However the use of standard splitter/combiners brings with it an important consideration: each splitting or combining of the beam causes a 3 dB loss of light power, as a beam traveling through a fiber optic transmission system may undergo many splittings and combinations the cumulative effect of the 3 dB losses can be very large.

One practicable splitter/combiner which does not incur the 3 dB losses is a so called polarization splitter/combiner in which an incoming beam having two orthogonal linear polarizations is split into two beams by being passed through a birefringent displacer or by the use of a polarizing beam splitter (either a prism cube or a thin film on a glass plate) with one beam having a first linear polarization state and the other a second linear polarization state with the first and second polarization states being orthogonal to each other. When used as a combiner a beam of a first linear polarization state from one input fiber is combined with a beam of second linear polarization state from a second input fiber into a third output fiber carrying both beams.

Previous polarization splitter/combiners relying on the use of polarizing beam splitters and birefringent displacers have required three lenses to couple light into the input and output fibers. The present invention is directed to an optical polarization splitter combiner of the "inline" type which provides a more compact coupler by using a reflector to reflect one of the beams back through the polarizing beam splitting cube (PBSC) or birefringent displacer. This has the advantage of using one collimating lens per two input or output fibers with all of the input and output fibers lying parallel to each other. The reduction in component count also greatly simplifies the necessary alignment of the components and thus reduces size and cost. The present invention also provides for the ready alignment of the components of the splitter/combiner to reduce insertion loss thus further saving cost and complexity.

An inline fiber optic polarization combiner/divider is proposed for use in fiber optic communications. It utilizes a polarizing beam splitting cube (PBSC) or a birefringent displacer placed between a pair of lenses. A reflecting film (either external or directly applied to one of the faces of the PBSC or birefringent displacer) is used to completely reflect one of the two polarizations and is positioned in the such that the optical path length between the lens and the reflecting film is equal to one focal length in order to accomplish an optical path where the input and output optical fibers are in-line with the package.

As a polarization splitter, the input optical signal is input through a polarization maintaining (PM) fiber or a single mode fiber (non-PM). The output optical signals are fed into two PM or non-PM optical fibers, one is placed next to the input fiber and the other is aligned on the other side of the PBSC or birefringent displacer. As a polarization combiner, the two input optical signals (with orthogonal polarizations) are input through two polarization maintaining (PM) fibers, one is placed next to the output fiber on one end of the PBSC or birefringent displacer and the other is aligned on the other side of the PBSC or birefringent displacer. The combined output optical signal is fed into an output fiber which can be either PM or single mode (non-PM). The common port fiber (the input fiber in a polarization divider operation or the output fiber in polarization combiner operation) can be a polarization maintaining fiber or a single mode fiber (non-polarization maintaining fiber) depending on the application requirement.

BRIEF DESCRIPTION OF THE DRAWINGS

For a better understanding of the invention, reference is made to the following drawings which are to be taken in conjunction with the detailed description to follow in which.

DESCRIPTION OF THE PREFERRED EMBODIMENTS

Figure 1:
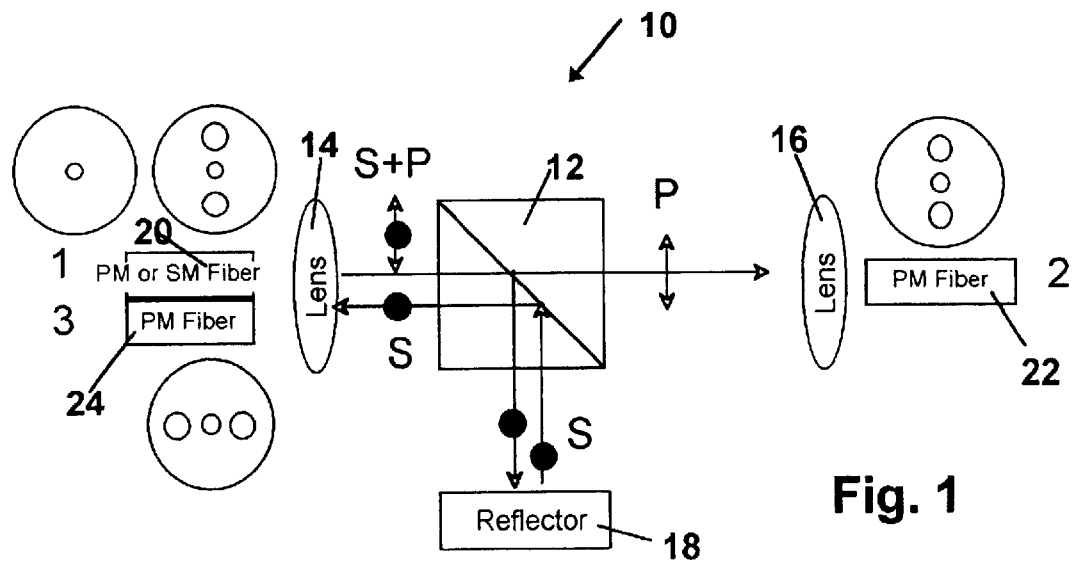
FIG. 1 illustrates the operation of an embodiment of an optical coupler of the present invention utilizing a polarizing beam splitting cube (PBSC) with a separate reflector, operated as a beam splitter.
Figure 2:
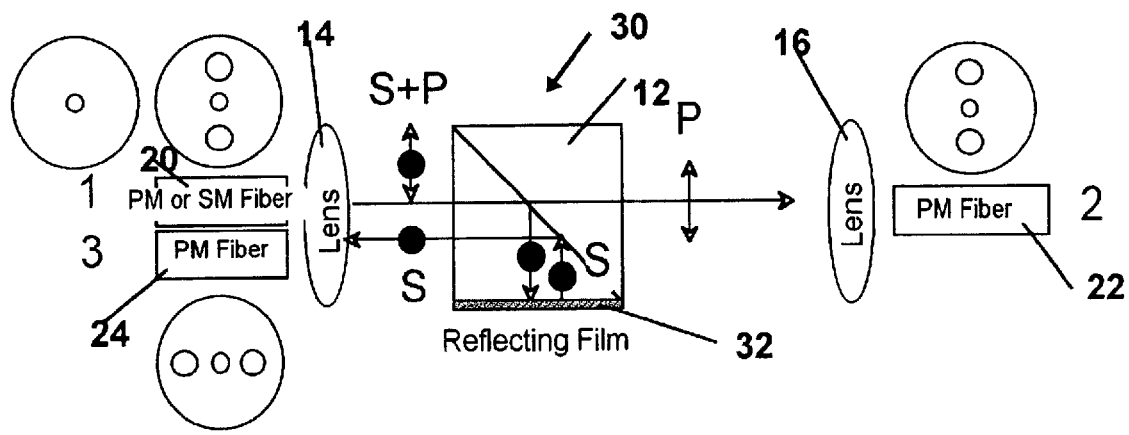
FIG. 2 illustrates the operation of an embodiment of an optical coupler of the present invention utilizing a PBSC with an integral reflector, operated as a beam splitter.
Figure 3:
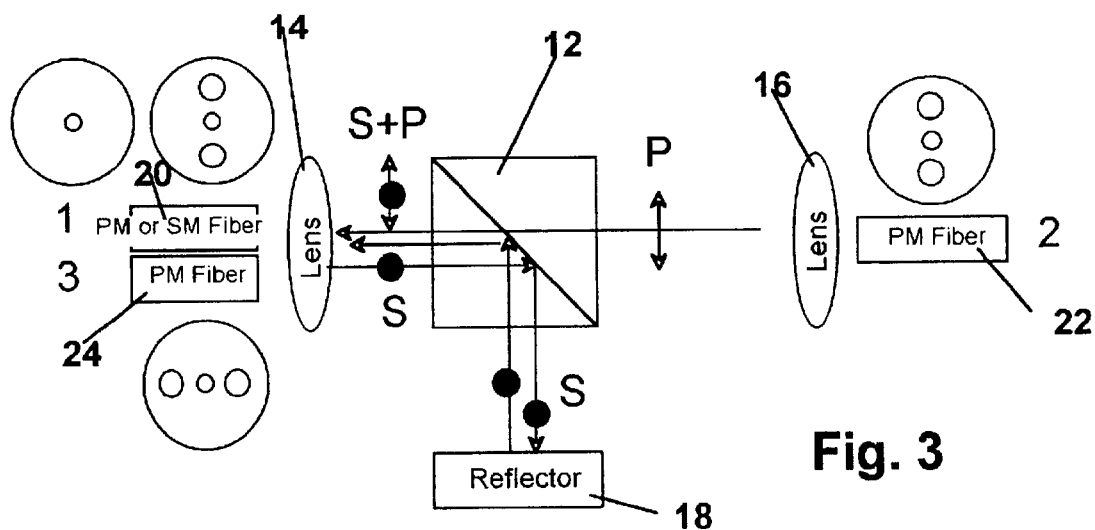
FIG. 3 illustrates the operation of the embodiment of an optical coupler utilizing a PBSC with a separate reflector, operated as a beam combiner.
Figure 4:
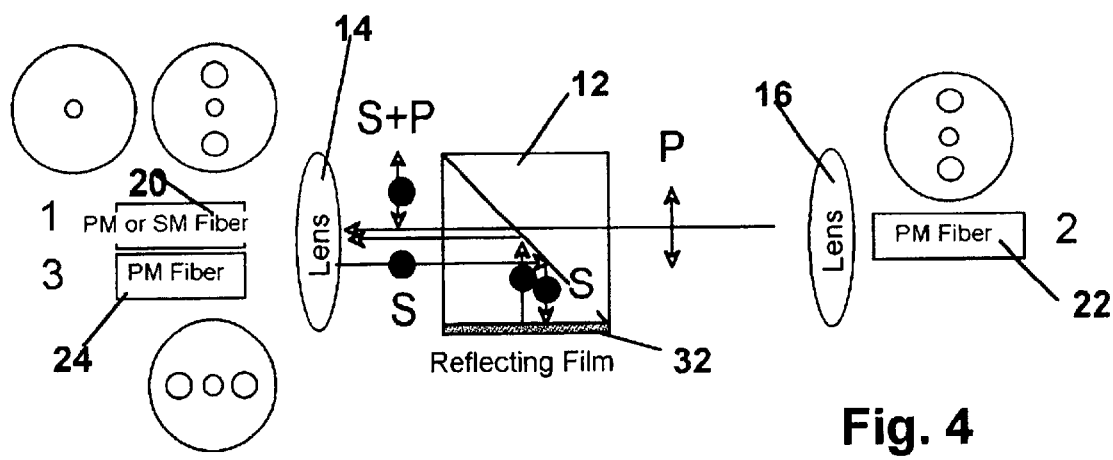
FIG. 4 illustrates the operation of the embodiment of an optical utilizing a PBSC with an integral reflector, operated as a beam combiner.

An optical coupler of the present invention using a polarizing beam splitting cube (PBSC) is shown in FIGS. 1–4 with splitters shown in FIGS. 1 and 2 and combiners shown in FIGS. 3 and 4. The splitter 10 of FIG. 1 consists of a polarizing beam splitting cube (PBSC) 12, a pair of collimating lenses 14 and, a reflector 18, and an input optical fiber 20 forming port 1, an output fiber 22 forming a second port and an output fiber 24 forming a third port and located parallel to that of input fiber 20. PBSC 12 is placed such that the optical path length to reflector 18 is equal to one focal length (1f) of input lens 14. Second lens 16 is positioned such that the optical path length between lenses 14 and 16 is twice the focal length of these lenses (2f) with the focal length of lenses 14, 16 being the same. This allows imaging of a reflected beam into fiber 24 of port 3. Collimating lenses 14, 16 may be of the usual types used in fiber optic systems such as graded index (GRIN) lenses. FIG. 2 illustrates a splitter 30 which has the same components as splitter 10 of FIG. 1 (as shown by the same reference numbers) except that the separate reflector 18 of FIG. 1 has been replaced by a reflecting film 32 directly applied to one of the prism faces of PBSC 12 is used to reflect one of the two polarizations in order to accomplish an in-line optical path.

As a polarization splitter (FIGS. 1 and 2), the input optical signal is input through polarization maintaining (PM) fiber or a single mode fiber 20 in port 1. Both S (indicated by a dot denoting an arrow into and out of the paper) and P (indicated by a vertical arrow) polarizations are assumed to be present in input fiber 20 of port 1. The S and P polarizations go into polarizing beam splitter 12 approximately collimated. The P polarization goes straight through and is focused on PM output fiber 22 by output lens 16 of port 2. The major axis of output fiber 22 is aligned with the P polarization as shown by the schematic representation of the alignment of the PM output fiber 22 directly above it. The S polarization beam emitted by input fiber 20 is reflected at 90° towards the reflector 18 of FIG. 1 or reflecting film 32 as in FIG. 2. The S polarization beam is then reflected back into PBSC 12 by reflector 18 or 32 and thereafter back into input lens 14 where it is focused on the output fiber 24 of port 3 as a result of the positioning of PBSC 12 and reflector 18, 32 with respect to lens 20 as described above. The major axis of output fiber 24 is aligned with the S polarization as shown by the schematic representation of output fiber 22 directly below it. PBSC 12, the ends of optical fibers 20, 22, 24, as well as lenses 14, 16 are preferably optically coated anti-reflection coatings to maximize throughput and minimize reflections.

FIGS. 3 and 4 illustrate the coupler of the present invention used as a polarization combiner, wherein the components of the device are identical to that shown in FIGS. 1 and 2, as shown by the use of the same reference numbers. The difference is that fibers 22 of port 2 and fiber 24 of port 3 are the input fibers with fiber 20 the output fiber. In the device a P polarized beam is launched from fiber 22 of port 2 which goes straight through PBSC 12 and is focused by lens 14 into fiber 20 forming common port 1 which is the output port. Fiber 24 of port 3 launches the S polarization beam which is reflected at 90° towards reflector 18, 32 (the reflecting film is either external as in FIG. 3 or directly deposited on the face of PBSC 12 as in FIG. 4). The S polarization beam is then reflected back into PBSC 12 and back into lens 14 where it is focused on the output fiber 20 of port 1 as a result of the positioning of PBSC 12 and reflector 18 and reflecting film 32 with respect to lens 14 as described above mentioned earlier. As such the output beam will comprise both S and P polarizations.

Figure 5:
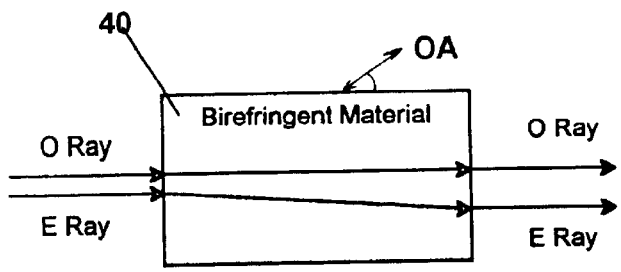
FIGS. 5 and 6 illustrate the operation of a birefringent displacer as a polarization beam splitting/combining element.
Figure 6:
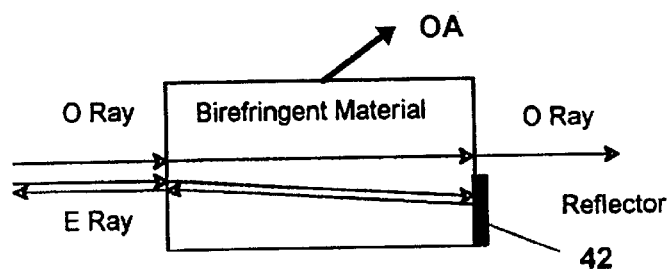
Figure 7:
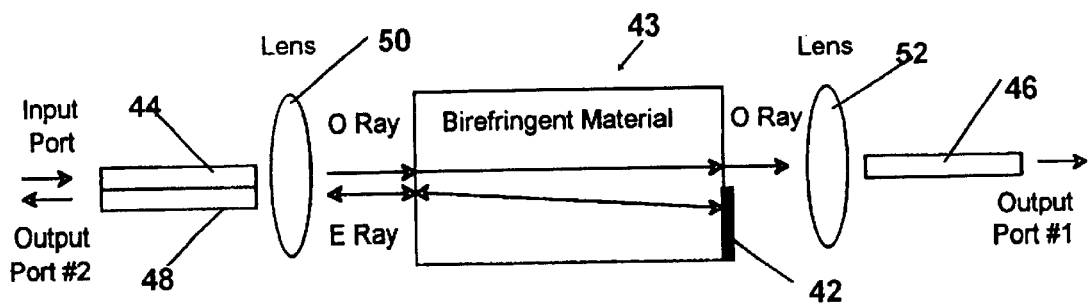
FIG. 7 illustrates the operation of an embodiment of an optical coupler of the present invention using a birefringent displacer as a beam splitter.
Figure 8:
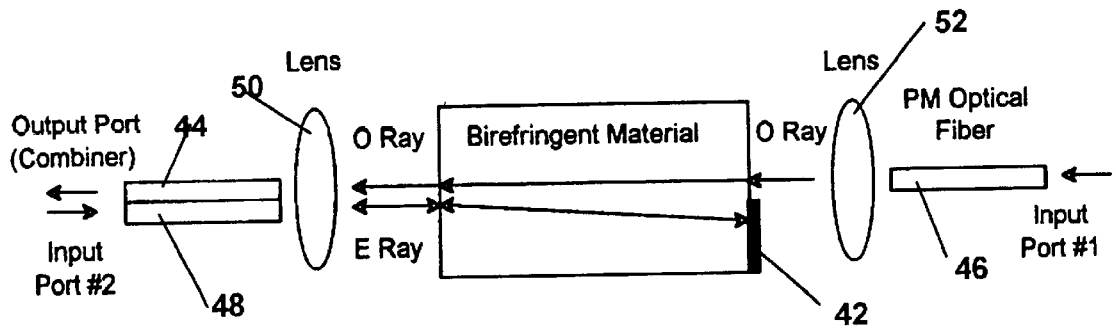
FIG. 8 illustrates the operation of the embodiment of an optical

FIGS. 5 and 6 illustrate the use of a birefringent displacer as the beam splitter/combiner to provide another embodiment of an optical coupler in accordance with the present invention. As shown in FIG. 5 a birefringent displacer 40 will divide an incoming beam into two component orthogonal polarization states, one beam having an E (extraordinary) polarization state and the other an O (ordinary) polarization state, with respect to the considered birefringent displacer. Suitable birefringent materials for use in birefringent displacer 40 include, but are not limited to, lithium niobate (LiNbO$_3$), rutile (TiO$_2$), and yttrium vanadate (YVO$_4$). Birefringent displacer 40 has its optical axis, illustrated by the arrow, arranged so that one of the beams, in this case the O ray remains essentially undeflected while the E beam undergoes divergence. If a reflector 42 is disposed on a face of birefringent material 40 so as to intercept one, but not both of the rays as shown in FIG. 5, one of the rays in this case the E beam, can be reflected back into birefringent material 40. This arrangement may be used to form a polarization splitter as shown in FIG. 7 and a polarization combiner as shown in FIG. 8. Reflector 42 can be configured as external from birefringent material 40 or directly deposited on a face of birefringent displacer 40 as shown herein.

A optical splitter 43 is shown in FIG. 7 which utilizes, in addition to birefringent material 40 and reflector 42, an input PM or SM fiber 44, a first output PM fiber 46 and a second output PM fiber 48 which is located proximate and parallel to input fiber 44. A single collimating lens 50 is used to couple the beams from fibers 44, 48 into birefringent material 40 and a collimating lens 52 is used to couple the beam between birefringent material 40 and fiber 46. Coupler 43 is configured such that the optical path length to reflector 42 is equal to one focal length (1f) of input lens 50. Second lens 52 is positioned such that the optical path length between lenses 50 and 52 is twice the focal length of these lenses (2f) with the focal length of both lens being the same, this allows lens 50 and 52 to be inline. Collimating lenses 50, 52 may again be of the usual types used in fiber optic systems such as graded index (GRIN) lenses. In operation a beam launched from fiber 44 will be split into O and E rays with the O ray being essentially unaffected by birefringent material 40 so that it will pass from birefringent material 40 through lens 52 to output fiber 46. The E ray will be refracted by the action of birefringent material 40 such that it impinges on reflector 42 which will reflect the E ray back through birefringent material 40 such that it will be coupled to output fiber 48 by lens 50. Thus coupler 43 when used as a splitter takes an input beam having two orthogonal polarization states and splits the input beam into two output beams having separate polarization states.

FIG. 8 illustrates coupler 43 of FIG. 7 used as a polarization combiner, the components of the device are identical to that shown in FIG. 7 as shown by the same reference numbers. The difference is that fiber 46 and fiber 48 are the input fibers with fiber 44 the output fiber. In the device a O polarized beam is launched from fiber 46 of port 2 which goes essentially straight through birefringent material 40 and is focused by lens 50 into fiber 20 forming a common port. An E beam launched from fiber 48 will be refracted by the action of birefringent material 40 such that it impinges on reflector 42 which will reflect the E ray back through birefringent material 40 such that it will be coupled to fiber 44 by lens 50. Thus coupler 43 when used as a combiner takes separate input beams having orthogonal polarizations and combines the input beams into a single output beam having both polarizations.

The invention has been described with respect to preferred embodiments. However, as those skilled in the art will recognize, modifications and variations in the specific details which have been described and illustrated may be resorted to without departing from the spirit and scope of the invention as defined in the appended claims.

What is claimed is:

1. A polarization optical splitter comprising:
   a polarizing beam splitter for splitting light into two orthogonal linear polarizations with one polarization being transmitted and the other being reflected;

an optical fiber forming an input port and disposed on a first side of said polarizing beam splitter, said fiber directing a light beam having two orthogonal linear polarizations into the polarizing beam splitter;

a polarization maintaining optical fiber forming a first output port and disposed on a second side of said polarizing beam splitter for receiving the polarized light transmitted through the polarizing beam splitter;

a polarization maintaining optical fiber forming a second output port, said fiber being disposed parallel to the optical fiber forming the input port;

a first collimating lens disposed between the polarizing beam splitter and the input and second output ports;

a second collimating lens disposed between the polarizing beam splitter and the first output port; and a reflector disposed at a position such that the optical path length to the reflector is equal to one focal length of the first collimating lens so as to reflect the beam reflected by the polarizing beam splitter back towards the polarizing beam splitter wherein the beam will be directed toward one of the second output fiber.

2. The polarization optical splitter as claimed in claim 1 wherein the beam splitter comprises a polarizing beam splitting cube.

3. The polarization optical splitter as claimed in claim 2 wherein the reflector comprises a reflecting film deposited on the polarizing beam splitting cube.

4. The polarization optical splitter as claimed in claim 1 wherein at least one of the collimating lenses comprise a GRIN lens.

5. The polarization optical splitter as claimed in claim 1 wherein the first and second collimating lenses have the same focal length and the optical path length between the collimating lenses is twice the focal length of the collimating lenses.

6. The polarization optical combiner as claimed in claim 1 wherein the first and second collimating lenses have the same focal length and the optical path length between the collimating lenses is twice the focal length of the collimating lenses.

7. A polarization combiner comprising:

a polarizing beam splitter for splitting light into two orthogonal linear polarizations with one polarization being transmitted and the other being reflected;

a polarization maintaining optical fiber forming a first input port and disposed on a first side of said polarizing beam splitter, said fiber directing a first light beam having a first orthogonal linear polarization into the beam splitting means such that it will be transmitted through the polarizing beam splitter;

a polarization maintaining optical fiber forming an output port and disposed on a second side of said polarizing beam splitter for receiving the polarized light transmitted through the polarizing beam splitter;

a polarization maintaining optical fiber forming a second input port, said fiber being disposed on the second side of the polarizing beam splitter and parallel to the optical fiber forming the output port; said fiber directing a light beam having a linear polarization that is orthogonal to that of the first light beam into the beam splitter such that the beam will be reflected by the beam splitting means;

a first collimating lens disposed between the polarizing beam splitter and the output and second input ports;

a second collimating lens disposed between the polarizing beam splitter and the first input port; and a reflector disposed at a position such that the optical path length to the reflector is equal to one focal length of the first collimating lens so as to reflect the beam reflected by the polarizing beam splitter back towards the polarizing beam splitter wherein the beam will be directed toward the output fiber.

8. The polarization optical combiner as claimed in claim 7 wherein the beam splitter comprises a polarizing beam splitting cube.

9. The polarization optical combiner as claimed in claim 8 wherein the reflector comprises a reflecting film deposited on the polarizing beam splitting cube.

10. The polarization optical combiner as claimed in claim 7 wherein at least one of the collimating lenses comprise a GRIN lens.

11. A polarization optical splitter comprising:

a birefringent displacer for separating light transmitted through said birefringent displacer into two beams having orthogonal linear polarizations with respect to each other with one polarization being displaced away from the other;

a first optical fiber forming an input port and disposed on a first side of said birefringent displacer, said fiber directing a light beam having two orthogonal linear polarizations into the birefringent displacer;

a polarization maintaining optical fiber forming a first output port and disposed on a second side of said birefringent displacer for receiving one of the beams transmitted through the birefringent displacer;

a polarization maintaining optical fiber forming a second output port disposed on the first side of the polarizing beam splitter and parallel to the optical fiber forming the input port;

a first collimating lens disposed between the birefringent displacer and the input and second output ports;

a second collimating lens disposed between the birefringent displacer and the output port; and reflector disposed at a position such that the optical path length to the reflector is equal to one focal length of the first collimating lens so as to reflect the displaced beam transmitted through the birefringent displacer back through the birefringent displacer wherein the beam will be directed toward the optical fiber forming the second output port.

12. The polarization optical splitter as claimed in claim 11 wherein the birefringent displacer comprises material selected from the group consisting of lithium niobate ($LiNbO_3$), rutile ($TiO_2$), and yttrium vanadate ($YVO)_4$.

13. The polarization optical splitter as claimed in claim 11 wherein the reflector comprises a reflecting film deposited on the birefringent displacer.

14. The polarization optical splitter as claimed in claim 11 wherein at least one of the collimating lenses comprise a GRIN lens.

15. The polarization optical splitter as claimed in claim 11 wherein the first and second collimating lenses have the same focal length and the optical path length between the collimating lenses is twice the focal length of the collimating lenses.

16. A polarization optical combiner comprising:

a birefringent displacer for transmitting light of a first polarization through said birefringent displacer without the light of the first polarization being displaced and displacing light having a second linear polarization away from the first beam;

a first polarization maintaining optical fiber forming a first input port and disposed on a first side of said birefringent displacer, said fiber directing a light beam having a first orthogonal linear polarization into the birefringent displacer;

an optical fiber forming a output port and disposed on a second side of said birefringent displacer for receiving one of the beams transmitted through the birefringent displacer;

a second polarization maintaining optical fiber forming a second input port, said fiber being disposed proximate to the optical fiber forming the output port, said fiber directing a light beam having a linear polarization that is orthogonal to that of the first light beam into the birefringent displacer such that the beam will be displaced by the birefringent displacer; and a reflector disposed so as to reflect the displaced beam transmitted through the birefringent displacer back through the birefringent displacer wherein the beam will be directed toward the optical fiber forming the output port.

17. The polarization optical combiner as claimed in claim 16 wherein the birefringent displacer comprises material selected from the group consisting of lithium niobate ($LiNbO_3$), rutile ($TiO_2$), and yttrium vanadate ($YVO)_4$.

18. The polarization optical combiner as claimed in claim 16 wherein the reflector comprises a reflecting film deposited on the birefringent displacer.

19. The polarization optical combiner as claimed in claim 16 wherein at least one of the collimating lenses comprise a GRIN lens.

20. The polarization optical combiner as claimed in claim 16 wherein the first and second collimating lenses have the same focal length and the optical path length between the collimating lenses is twice the focal length of the collimating lenses.

* * * * *

UNITED STATES PATENT AND TRADEMARK OFFICE
CERTIFICATE OF CORRECTION

PATENT NO.      : 6,411,749 B1
DATED           : June 25, 2002
INVENTOR(S)     : Chia-Chi Teng et al.

It is certified that error appears in the above-identified patent and that said Letters Patent is hereby corrected as shown below:

<u>Title page,</u>
Item [73], change Assignee from "Micro-Optice, Inc." to -- Micro-Optics, Inc. --

Signed and Sealed this

Twentieth Day of August, 2002

Attest:

JAMES E. ROGAN
Attesting Officer    Director of the United States Patent and Trademark Office